United States Patent [19]

Anderson

[11] 4,135,742

[45] Jan. 23, 1979

[54] ADJUSTABLE TUBE COUPLING

[75] Inventor: Gordon H. Anderson, Harbor City, Calif.

[73] Assignee: Rockwell International Corporation, El Segundo, Calif.

[21] Appl. No.: 767,406

[22] Filed: Feb. 10, 1977

[51] Int. Cl.² ............................................. F16L 21/00
[52] U.S. Cl. ...................................... 285/87; 285/233; 285/165; 285/353; 285/388
[58] Field of Search .................... 285/233, 234, 49, 82, 285/87, 302, 163, 165, 224, 354, 353, 388

[56] References Cited

U.S. PATENT DOCUMENTS

| | | | |
|---|---|---|---|
| 1,288,631 | 12/1918 | McFarland | 285/224 X |
| 2,646,294 | 7/1953 | Anderson | 285/165 |
| 3,186,740 | 6/1965 | Lee | 285/354 X |
| 3,438,657 | 4/1969 | Torres | 285/233 |
| 3,801,954 | 4/1974 | Dorrell | 285/82 X |
| 4,007,953 | 2/1977 | Powell | 285/388 X |

FOREIGN PATENT DOCUMENTS 693637 7/1953 United Kingdom ...................... 285/48

Primary Examiner—Wayne L. Shedd
Attorney, Agent, or Firm—Charles T. Silberberg

[57] ABSTRACT

A coupling for tubular members in mechanically flexible fluid tight relation, and providing cooperative means permitting limited axial, angular, and radial misalignment, while maintaining fluid tight connection. The unique design of this coupling allows for accommodating the various misalignments with assurance of fluid tight connection in a straight forward, inexpensive manner. Optional features which provide for damping of vibrations from the fluid lines to the coupling and means opposing axial forces tending to separate the fluid lines connected by the coupling are also disclosed.

6 Claims, 8 Drawing Figures

ADJUSTABLE TUBE COUPLING

BACKGROUND OF THE INVENTION

The present invention relates to a device for providing a fluid tight mechanically adjustable coupling for tubular or duct members accommodating limited axial, angular, and radial misalignment.

Any transfer of a medium through tubing, and especially aircraft where weight saving is of prime importance, thin mold metallic tubing is interconnected and coupled with fluid tight couplings. Heretofore, the prior art of lightweight tube couplings, as those used in low to moderate pressure systems aircraft designs, have generally been limited to only two of three degrees of freedom (axial, angular, and radial). Others have been severely limited to the magnitude of the freedom where all three degrees of freedom are employed in the design, as exemplified by U.S. Pat. No. 2,646,294 to Anderson. In addition, those that have dependence on simple elastomeric sealing, such as U.S. Pat. No. 3,569,934 to Decenzo, have suffered from an abnormally high leakage rate. Others, such as U.S. Pat. No. 3,799,586 to Caras, et al., have been extremely complex and employ mechanisms like ball bearings which increases the weight and makes the cost of mass manufacturing prohibitive. Features such as damping vibrations transmitted from the fluid lines to the coupling and means for opposing forces tending to axially separate the fluid lines from the coupling have not been disclosed.

It is, therefore, an object of the present invention to provide a coupling suitable for connecting misaligned conduits.

It is another object of the present invention to provide a lightweight coupling that accommodates axial, angular, and radial misalignment in the members to be connected.

It is another object of the present invention to provide a relatively simple adjustable coupling, free of complex, expensively machined parts.

Moreover, another object of the present invention is to provide a positive means of preventing coupling separation from high internal pressures.

Still another object of the present invention is to provide for damping of vibrations transmitted from the members connected to the coupling.

Other objects and advantages of the present invention will become apparent upon reading the following detailed description and upon reference to the drawings.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Figure 1:
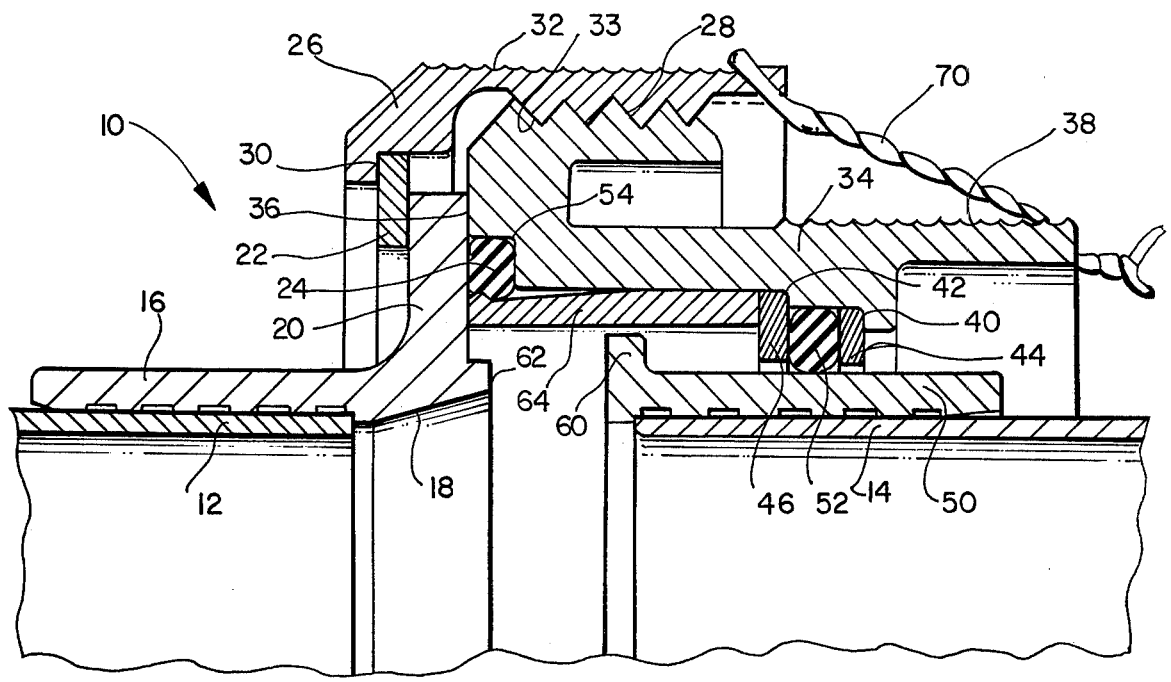
FIG. 1 is a fragmentary longitudinal sectional view of the coupling device of the present invention.

Referring now to FIG. 1, there is shown a first embodiment of the invention where the coupling, generally illustrated at 10, connects in fluid communication two similarly sized ducts 12 and 14 with each other. Ducts 12 and 14 are preferably lightweight, thinwalled, tubing of the aircraft type, similar to that employed in aircraft cooling, pressurization, and fuel systems. A tube adaptor 16 is swaged onto the tubing 12 in a standard manner. This provides a fluid tight seal between tube 12 and adaptor 16. The tube adaptor 16 has a chamfered internal edge 18 that comes in contact with the fluid flow to prevent internal turbulence. Tube adaptor 16 has an outwardly extending flange 20 at one end and one side of flange 20 slidably engages a split ring retainer 22. The other side of the flange 20 forms a slidable sealing surface with "O" ring 24. Radial movement of the tube adaptor 16 between split ring 22 and "O" ring 24 provides for accommodating radial misalignment between ducts 12 and 14. The ring retainer 22 is split to allow its assembly behind the tube adaptor 16.

A knurled retaining collar 26 which is threaded internally at 28 is installed on the tube adaptor 16 before the slip ring 22 for ease of assembly. Retaining collar 26 is provided at one end with an internally extending flange or stop shoulder 30 which firmly holds the retaining ring 22 in place. The knurled outside surface 32 of the retaining collar 26 provides a surface for a strap like wrench to facilitate connections that can be encountered in aircraft, where movement is limited.

The retaining collar 26 engages internal threads 33 of coupling housing 34. Housing 34 has a face 36 which bears against flange 20 when securely engaged. The coupling housing 34 also has a knurled surface 38 for a strap-like wrench. Machined on the internal surface of coupling housing 34 are two stop shoulders 40 and 42 that abuttingly engage split ring retainers 44 and 46 respectively. These retaining rings are split to facilitate assembly onto a tube adaptor 50.

Assembled in between retaining rings 44 and 46 is an "O" ring 52 which provides sealing between the coupling housing 34 and the tube adaptor 50. The coupling housing 34 has a shoulder groove 54 in which "O" ring 24 is positioned.

The tube adaptor 50 is swaged onto the tubing 14 to provide a fluid tight seal. Tube adaptor 50 is machined with a flange 60 which restricts the longitudinal movement of tube 14 in one direction when the split ring 46 abuttingly engages the flange 60. The flange 60 abuts the edge 62 of tube adaptor 16 and restricts the longitudinal movement of tube 14 in the other direction. These two restrictions provide the limits for the longitudinal misalignment of 12 and 14.

A compression sleeve 64 is provided to abuttingly engage one side of split ring 46 with one end and abuttingly engage flange 20 with its other end. Compression sleeve 64 provides a containment for "O" ring 24 between shoulder groove 54 and flange 20.

Angular adjustment may also be obtained in the subject arrangement through the ability of tubular member 14 to pivot about "O" ring 52. This movement is limited by contact of the outer end of flange 60 with compression sleeve 64. An optional lockwire 70 may be connected to retaining collar 26 and coupling housing 34 to ensure locking of the mechanism.

Figure 2:
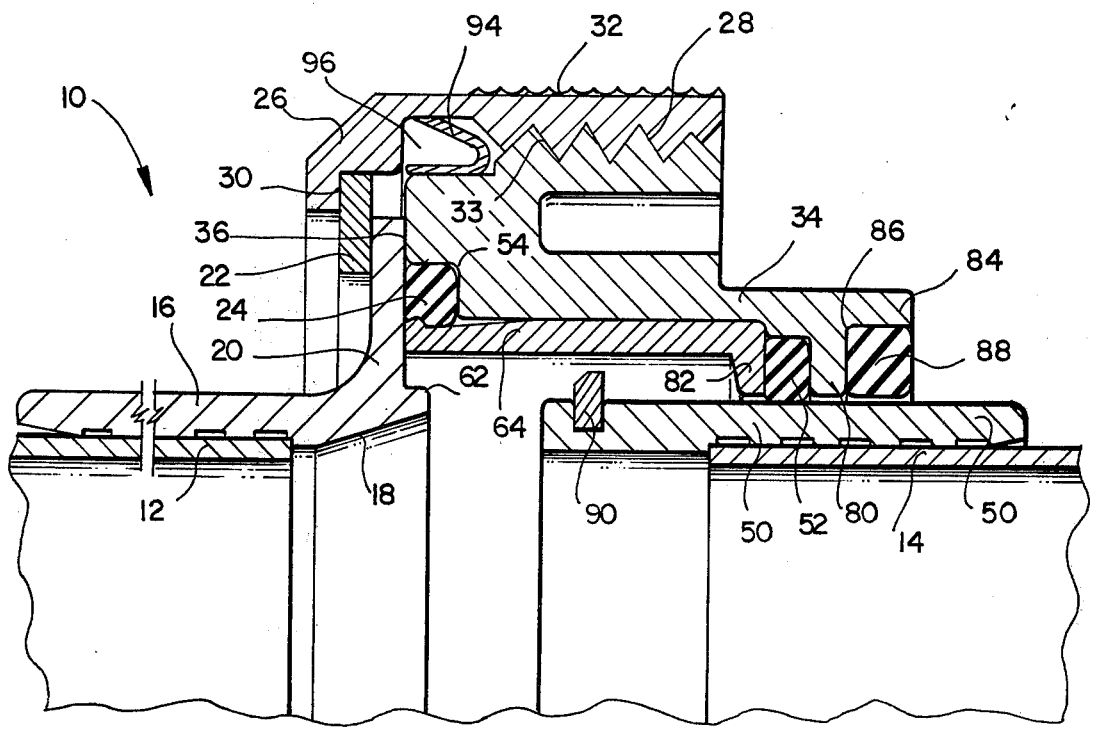
FIG. 2 is a view similar to FIG. 1 showing a second embodiment of the flexible fluid tight coupling for tubes.

Another embodiment of the adjustable tube coupling 10 in accordance with the present invention is shown in FIG. 2. This embodiment uses the same numerals to identify corresponding parts of the first embodiment. The FIG. 2 embodiment which connects ducts 12 and 14 is constructed and operates generally in the same manner as the FIG. 1 embodiment. The construction of the coupling members to accommodate radial misalignment is identical to that of the first embodiment. Coupling housing 34 is designed in a somewhat different manner by having an internally extending flange 80 instead of a stop shoulder 40. Compression sleeve 64 is provided with an integral angle end 82. "O" ring 52 is contained within the annular area defined by angle end 82, coupling housing 34, flange 80, and tube adaptor 50. Coupling housing 34 also has a protruding end 84 which projects normally to flange 80 and defines a corner groove 86. An annular ring of damping material 88 is bonded within groove 86. Damping material 88 absorbs vibrations between duct 14 and coupling housing 34.

Tube adaptor 50 has an annular groove on the upper surface thereof which contains a split ring 90. Split ring 90 restricts longitudinal movement of ducts 12 and 14 in one direction by abuttingly engaging angle end 82 of compression sleeve 64. Internal face 90 of tube adaptor 50 will abuttingly engage edge 62 of tube adaptor 16 to restrict longitudinal movement in the other direction. The angular movement of this embodiment is the same as that described in the first embodiment except that split ring 90 will contact compression sleeve 64 to restrict or limit such movement.

To provide locking between retaining collar 26 and coupling housng 34, a locking device 94 in the form of an annular V-shaped spring is provided in annular area 96. Locking device 94 frictionally engages both collar 26 and coupling housing 34.

Figure 3:
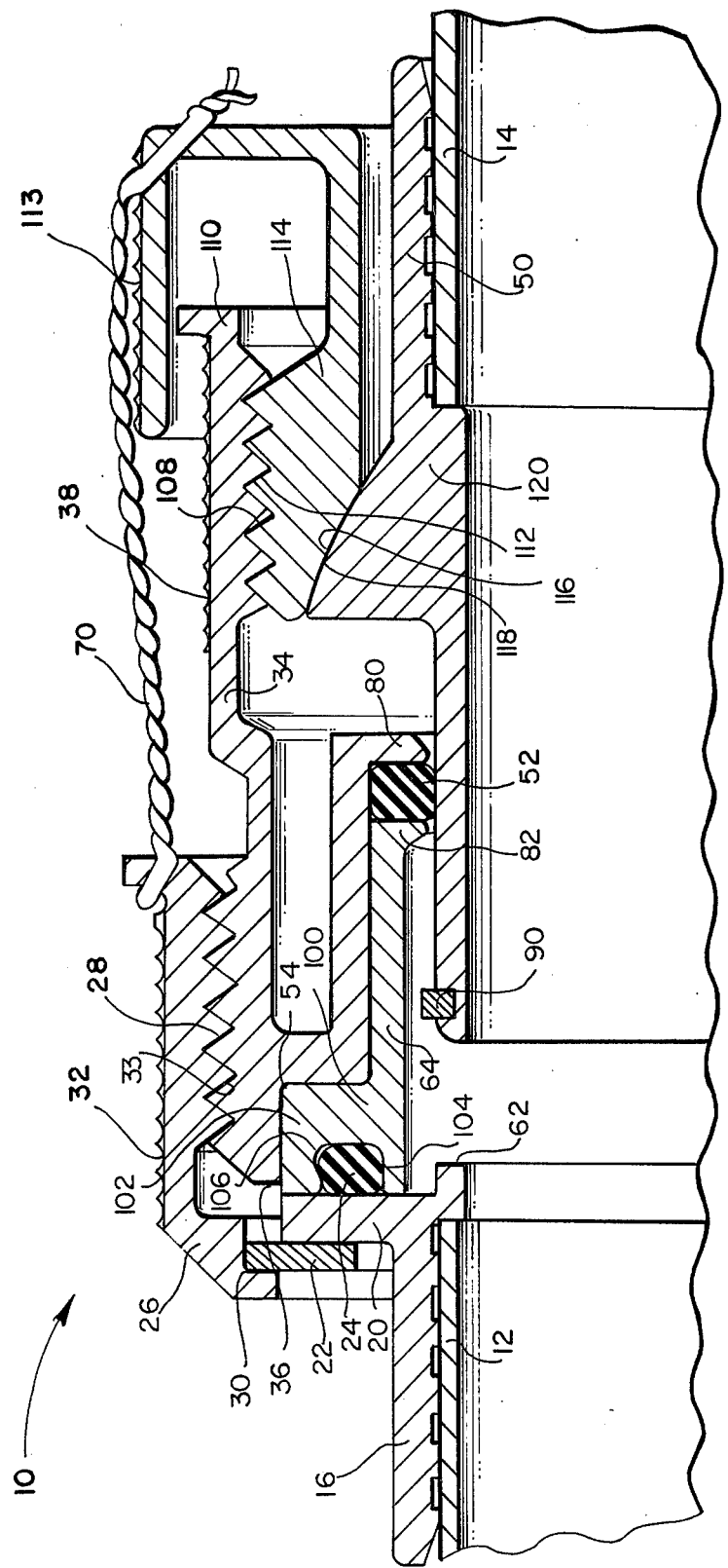
FIG. 3 is a view similar to FIGS. 1 and 2 showing a third embodiment of the adjustable fluid tight coupling.

Another embodiment of the present invention is illustrated in FIG. 3. This embodiment uses the same numerals to identify corresponding parts of the first and second embodiments. The compression sleeve 64 for this embodiment has an integral, outwardly extending flange 100 which has a transverse end portion 102 which projects in a parallel plane to the body of compression sleeve 64. Flange 100 and projecting end 102 along with a projecting end 104 which aligns with the body of compression sleeve 64 define an annular groove 106 in which is positioned "O" ring 24. Flange 20 abutts against projecting ends 102 and 104 and "O" ring 24 which provides sealing engagement. Flange 100 abutts against shoulder groove 54 of coupling housing 34.

Radial misalignment is accommodated in the same fashion as in the FIGS. 1 and 2 embodiments. Longitudinal misalignment is accommodated in the same fashion as the FIG. 2 embodiment.

In this embodiment, the outer surface of coupling housing 34 is extended and internally threaded at 108 near the end 110 thereof. Threads 108 mesh with threads 112 of internal plug load adaptor 114. Adaptor 114 is provided with an arcuate surface 116. Surface 116 is designed to register with arcuate outer surface 118 of integral flange 120 of tube adaptor 50. Internally generated pressures can be absorbed to a greater degree with this embodiment in that forces tending to move ducts 12 and 14 axially away from each other are opposed by surface 118 bearing against surface 116. The arcuate shape of surfaces 116 and 118 allows for angular rotating such as with embodiments 1 and 2 about "O" ring 52 to accommodate angular misalignment of ducts 12 and 14. Adaptor 114 is also provided with a knurled surface 113 to accommodate a strap-like wrench.

Figure 4:
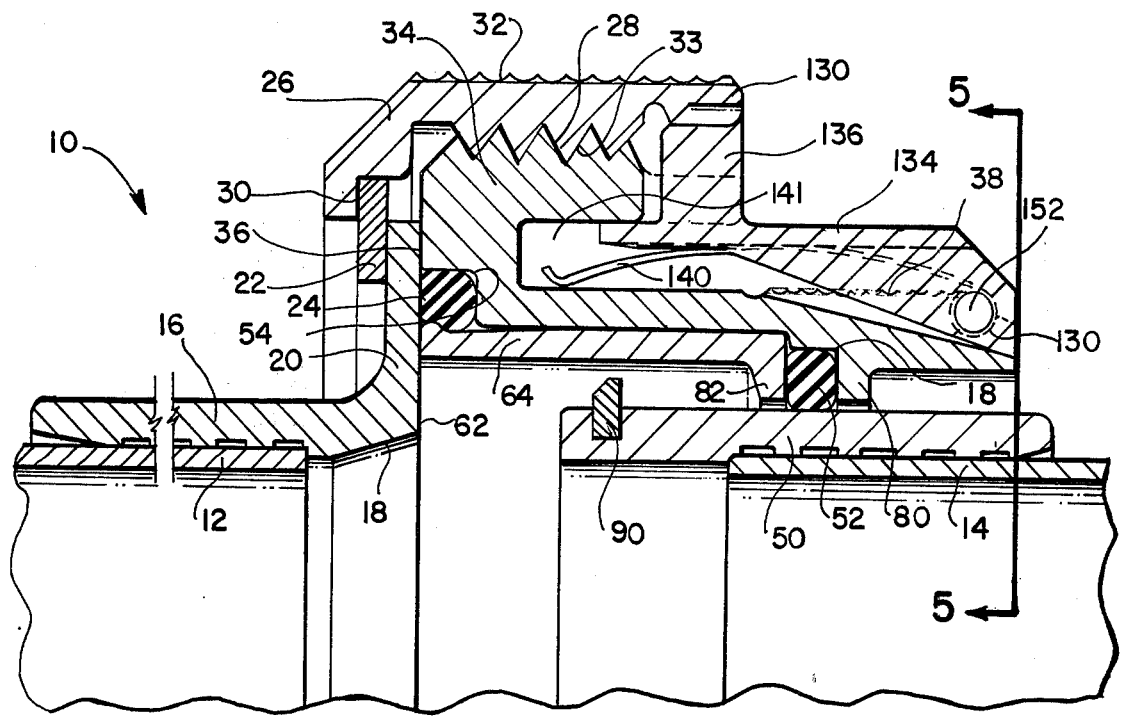
FIG. 4 is a view similar to FIGS. 1-3 showing a fourth embodiment of the flexible fluid tight coupling.
Figure 5:
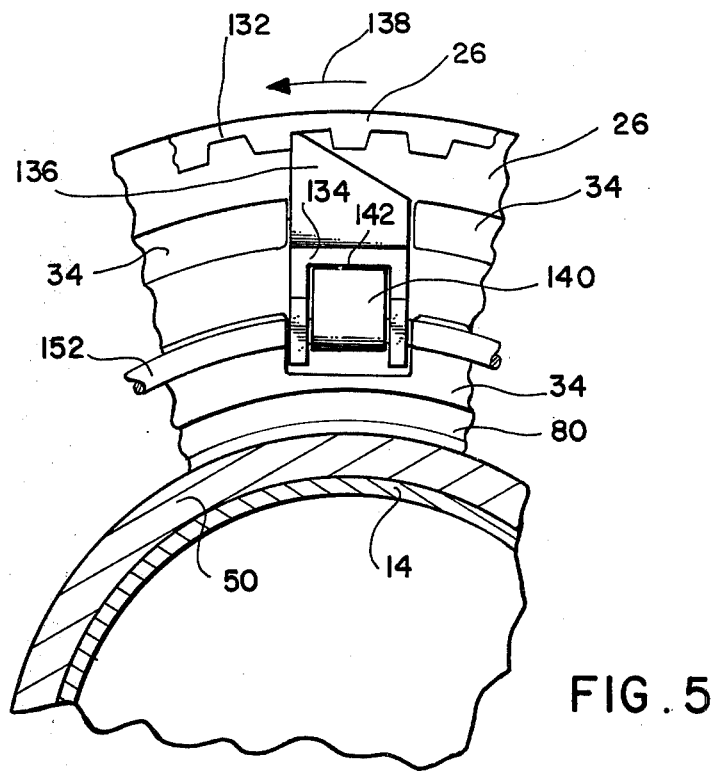
FIG. 5 is a fragmentary sectional view taken in the direction of arrows 5—5 of FIG. 4 of the locking mechanism of FIG. 4.

Referring to FIGS. 4 and 5, there is shown a fourth embodiment of the present invention. This embodiment is much like the second embodiment fitted with a self-locking device. This embodiment uses the same numerals to identify corresponding parts of embodiments 1 and 2. Retaining collar 26 has an integral extended portion 130 which extends past threaded area 33 of coupling housing 34. Portion 130 has serrations 132 on the internal surface thereof. A lock latch member 134 is provided with an upwardly extending latch portion 136 having an upper wedge shape. Latch 136 is designed to fit within serrations 132. The wedge shape is provided to allow the serrations to slip over the latch 136 when the retaining collar 26 is tightened in the direction of arrows 138 but provide a stop to prevent reverse movement of retaining collar 26. Latch 136 is resiliently biased upward against serrations 132 by a leaf-spring 140. Spring 140, which is positioned in an annular area 141 between coupling housing 34 and lock latch member 134, bears against the internal surface 142 of locking member 134. Spring 140 is retained in an annular groove 150 within coupling housing 34 by a retaining ring 152 which is forcibly fit into groove 150. Latch 136 can be released from serrations 132 by pressing downward on lock latch member 134 to depress spring 140.

Figure 6:
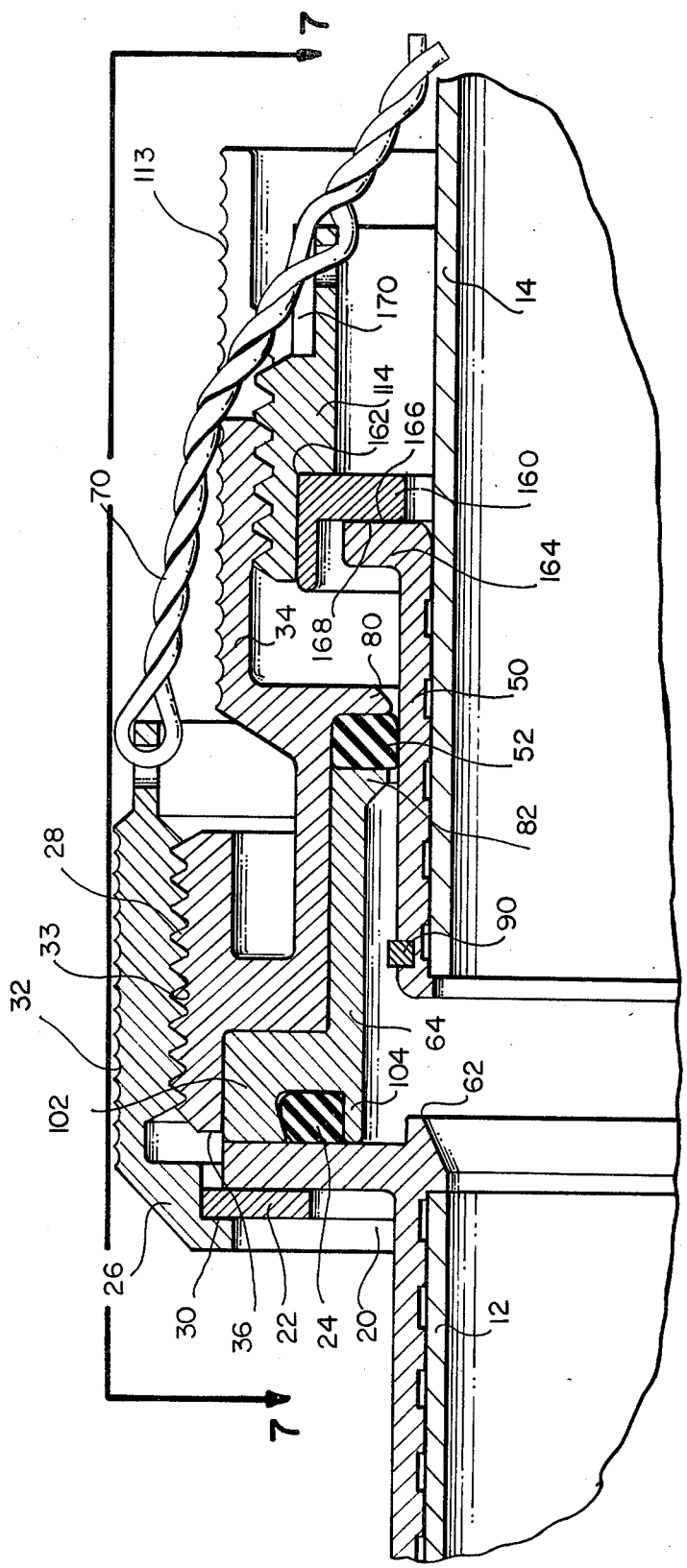
FIG. 6 is a view similar to FIGS. 1-4 showing a fifth embodiment of the flexible fluid tight coupling.

FIG. 6 shows a fifth embodiment of the present invention. This embodiment is much like the third embodiment with an alternate design of the internal plug load adaptor. This embodiment uses the same numerals to identify corresponding parts of embodiments 1, 2, and 3.

Internal plug load adaptor 114 is provided with an internal annular shoulder groove 162 which abuttingly engages split ring 160. Tube adaptor 50 is machined with an outwardly extending flange 164. Surface 166 of split ring 160 is designed to abuttingly engage surface 168 of flange 164. Split ring 160 is positioned against flange 164 by longitudinal adjustment of plug load adaptor 114, which is threadably engagable with coupling housing 34. Forces which tend to move ducts 12 and 14 axially away from each other are opposed by surfaces 166 and 168.

Angular adjustment is accomplished by tubular member 14 pivoting about "O" ring 52 while surfaces 166 and 168 slideably engage each other. Radial misalignment is accommodated in the same fashion as in the FIGS. 1 and 2 embodiment. Longitudinal misalignment is accommodated in the same fashion as the FIG. 2 embodiment.

Figure 7:
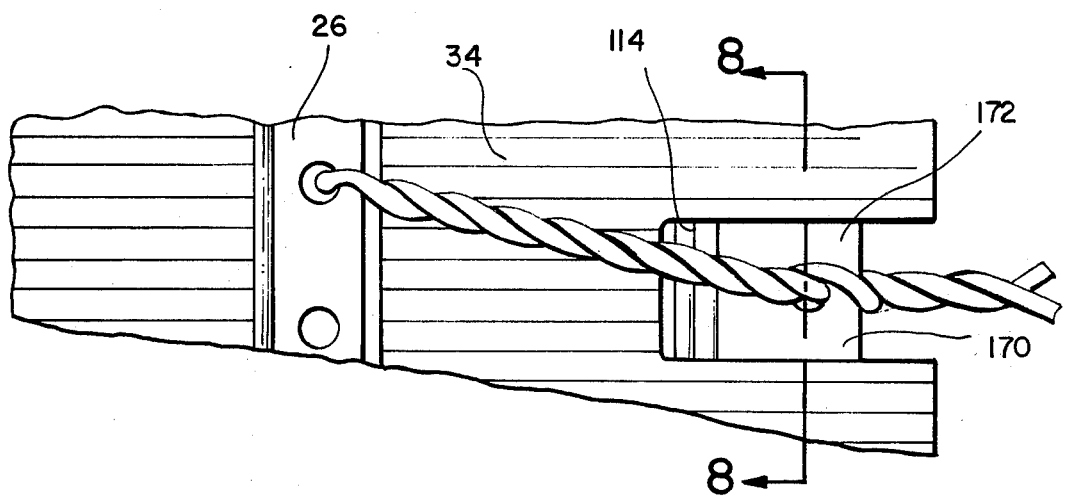
FIG. 7 is a fragmentary view taken in the direction of arrows 7—7 of FIG. 6 of the locking mechanism of FIG. 6.
Figure 8:
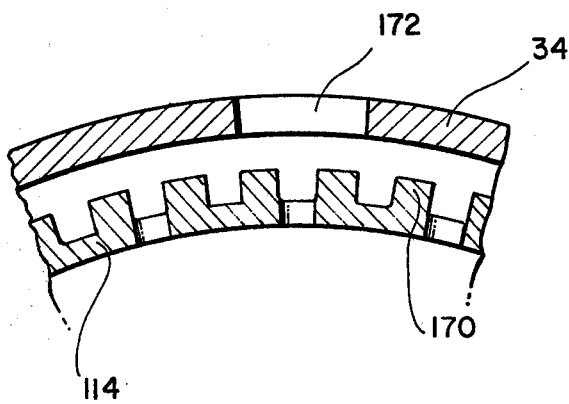
FIG. 8 is a fragmentary view taken in the direction of arrows 8—8 of FIG. 7 of the notches on the outside of the internal plug load adaptor.

FIG. 7 illustrates the manner in which the internal plug load adaptor 114 is locked to the retaining collar 26. A slot 172 in coupling housing 34 allows a lockwire 70 to be connected to retaining collar 26 and plug load adaptor 114. Slot 172 also allows torqueing means to be utilized on the internal plug load adaptor 114 by application against lands 170 in a lever type action. FIG. 8 shows the relationship of slot 172 and lands 170 on internal plug load adaptor 114.

Thus, it is apparent that there has been provided, in accordance with the invention, ad adjustable tube coupling that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. An adjustable fluid type coupling adapted for connecting two ducts in a manner accommodating limited axial, angular, and longitudinal misalignment of the ducts comprising:
   a first annular tube adaptor sealingly connected to an end of one duct, said first tube adaptor having an outwardly extending flange;
   a retaining collar, one end of said retaining collar being internally threaded, the other end of said retaining collar having an inwardly extending flange and an internal recessed annular surface;
   a retaining means interposed between said outwardly extending flange and said inwardly extending flange, said outwardly extending flange adapted to abuttingly engage said recessed annular surface with freedom for radial movement relative thereto;
   an annular compression sleeve having one end abutting against said outwardly extending flange, said one end of said compression sleeve having an annular groove therein;
   a first sealing means positioned within said annular groove and bearing against said outwardly extending flange;
   an annular coupling housing threadably secured to said retaining collar;
   a second annular tube adaptor sealingly connected to an end of the second duct;
   a second sealing means interposed between said second tube adaptor and said coupling housing, said second sealing means abutting against the other end of said compression sleeve; and
   a retaining means on said second tube adaptor for limiting axial movement of said second tube adaptor relative to said first tube adaptor, said second tube adaptor being tiltable about said second sealing means, said retaining means on said second tube adaptor adapted to abuttingly contact said compression sleeve with freedom for angular movement relative thereto.

2. The coupling as described in claim 1 also including an internal plug load adaptor threadably secured to said coupling housing, said internal plug load adaptor having a side with an arcuate surface, and wherein said second tube adaptor has an outwardly extending flange, one side of said outwardly extending flange on said second tube adaptor having an arcuate surface complementary to and abutting against said arcuate surface of said internal plug load adaptor, whereby forces tending to move said tube adaptor axially apart are opposed.

3. The coupling as described in claim 1 also including an internal plug load adaptor and a retaining ring, said internal plug load adaptor being threadably secured to said coupling housing, said internal plug load adaptor having a shoulder groove, and wherein said second tube adaptor has an outwardly extending flange, and said retaining ring is interposed between and abutts against said shoulder groove and said outwardly extending flange on said second tube adaptor, whereby forces tending to move said tube adaptors apart are opposed.

4. The coupling as described in claim 3 also including a locking means between said retaining collar and said internal plug load adaptor for preventing extraneous movement of said retaining collar relative to said plug load adaptor.

5. The coupling as described in claim 1 wherein said locking means comprises an internal surface of said collar, said surface having serrations thereon, a latch member, and a spring, said latch member being biased upwardly against said serrations by said spring.

6. An adjustable fluid type coupling adapted for connecting two ducts in a manner accommodating limited axial, angular, and longitudinal misalignment of the ducts comprising:
   a first annular tube adaptor sealingly connected to an end of one duct, said first tube adaptor having an outwardly extending flange;
   a retaining collar, one end of said retaining collar being internally threaded, the other end of said retaining collar having an inwardly extending flange and an internal recessed annular surface;
   a retaining means interposed between said outwardly extending flange and said inwardly extending flange, said outwardly extending flange adapted to abuttingly engage said recessed annular surface with freedom for radial movement relative thereto;
   an annular compression sleeve having one end abutting against said outwardly extending flange;
   a first sealing means bearing against said outwardly extending flange and said compression sleeve;
   an annular coupling housing threadably secured to said retaining collar;
   a second annular tube adaptor sealingly connected to an end of the second duct;
   a second sealing means interposed between said second tube adaptor and said coupling housing;
   a retaining means on said second tube adaptor for limiting axial movement of said second tube adaptor relative to said first tube adaptor, said second tube adaptor being tiltable about said second sealing means, said retaining means on said second tube adaptor adapted to abuttingly contact said compression sleeve with freedom for angular movement relative thereto; and
   locking means between said retaining collar and said coupling housing for preventing extraneous movement of said retaining collar relative to said coupling housing, said locking means comprising an internal surface of said collar, said surface having serrations thereon, a latch member, and a spring, said latch member being biased upwardly against said serrations by said spring.

* * * * *